United States Patent
Watt et al.

(10) Patent No.: US 9,464,713 B2
(45) Date of Patent: Oct. 11, 2016

(54) MODULAR ASSEMBLY FOR POWER TRAIN

(71) Applicant: DEERE & COMPANY, Moline, IL (US)

(72) Inventors: Dwayne B. Watt, Bartlesville, OK (US); G. William Detrick, Coffeyville, KS (US); Cecil H. Wise, Jr., Coffeyville, KS (US)

(73) Assignee: Deere & Company, Moline, IL (US)

( * ) Notice: Subject to any disclaimer, the term of this patent is extended or adjusted under 35 U.S.C. 154(b) by 168 days.

(21) Appl. No.: 14/313,845

(22) Filed: Jun. 24, 2014

(65) Prior Publication Data

US 2015/0369360 A1 Dec. 24, 2015

(51) Int. Cl.
*F16H 3/08* (2006.01)
*F16H 57/02* (2012.01)
*F16H 61/02* (2006.01)
*F16H 61/00* (2006.01)
*F16H 57/033* (2012.01)
*F16H 3/091* (2006.01)

(52) U.S. Cl.
CPC ........ *F16H 61/0267* (2013.01); *F16H 57/033* (2013.01); *F16H 61/0009* (2013.01); *F16H 3/0915* (2013.01); *F16H 2057/0335* (2013.01); *Y10T 74/19251* (2015.01)

(58) Field of Classification Search
CPC ........... F16H 3/006; F16H 2003/0931; F16H 3/091; F16H 47/02; F16H 57/02
USPC ........................................ 74/331, 335, 606 R
See application file for complete search history.

(56) References Cited

U.S. PATENT DOCUMENTS 3,703,107 A * 11/1972 Piret ...................... F16H 47/08
180/297
4,226,200 A * 10/1980 Morisawa ................. F16H 3/66
74/606 R
4,867,008 A * 9/1989 Yamaoka .............. F16H 57/037
180/344
4,879,921 A * 11/1989 Asada .................... F16H 57/027
184/11.1
5,295,413 A * 3/1994 Sherman ................. B60K 1/00
74/421 A
5,509,329 A 4/1996 Jackson et al.
6,491,586 B1 12/2002 Nakamura et al.
7,181,989 B2 2/2007 Obinata (Continued)

FOREIGN PATENT DOCUMENTS

EP 1334861 A1 8/2003
GB 1180633 A 2/1970

(Continued)

OTHER PUBLICATIONS

German Patent and Trade Mark Office, Search Report for German Patent Application No. 10 2015 210 841.4 mailed Dec. 8, 2015.

*Primary Examiner* — Ha D Ho
(74) *Attorney, Agent, or Firm* — Lorenz & Kopf, LLP

(57) ABSTRACT

A modular assembly is described for a power train. An assembly housing includes first and second cavities connected by an inter-cavity passage. An input shaft and an output shaft linked by a first clutch are disposed, at least in part, in the first cavity. A hydraulic control assembly provides hydraulic control signals to control, at least in part, the first clutch device. A hydraulic quill insert disposed, at least in part, in the inter-cavity passage, includes a plurality of control passages. The hydraulic quill insert receives the hydraulic control signals and directs the signals to control power flow from the input shaft to the output shaft.

14 Claims, 12 Drawing Sheets

(56) References Cited

U.S. PATENT DOCUMENTS 7,766,778 B2 8/2010 Tabata et al.
2012/0310461 A1* 12/2012 Maruyama ............ B60K 6/445
701/22

FOREIGN PATENT DOCUMENTS

| JP | 2006161867 A | 6/2006 |
|---|---|---|
| WO | 0234561 A1 | 5/2002 |

* cited by examiner

MODULAR ASSEMBLY FOR POWER TRAIN

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to transmission of mechanical power, including transmission of mechanical power through a transaxle assembly of a work vehicle.

BACKGROUND OF THE DISCLOSURE

Depending on various factors, including the nature of operations to be performed, the operational environment, the desired cost or complexity of included systems, and so on, it may be useful to provide various different types of power trains (and power train components) for various vehicles (or other platforms). For example, a relatively low-cost and low-complexity work vehicle may provide a limited number of gear ratios between an engine and the vehicle wheels, while a higher-cost and higher-complexity work vehicle may provide a greater number of gear ratios.

Although such variation in power train design may provide for enhanced consumer options, it may also lead to increased complexity for manufacturing plants and assembly lines. For example, if multiple power train designs may be applied to a particular vehicle type (e.g., a particular tractor), this may require a large number of parts, manufacturing processes, assembly lines, and so on. This may introduce undesirable cost and complexity.

SUMMARY OF THE DISCLOSURE

A modular assembly for a power train is disclosed. According to one aspect of the disclosure, an assembly housing includes first and second cavities connected by an inter-cavity passage. An input shaft and an output shaft linked by a first clutch are disposed, at least in part, in the first cavity. A hydraulic control device provides hydraulic control signals to control, at least in part, the first clutch device. A hydraulic routing system receives hydraulic control signals from the hydraulic control device and directs the signals to control power flow from the input shaft to the output shaft. The routing system may include a hydraulic quill insert disposed, at least in part, in the inter-cavity passage, the hydraulic quill insert including a plurality of control passages.

In certain embodiments, various countershafts are provided, which may be separately received within the housing without modifying the housing. The countershafts may include various gears and clutch devices and various associated flow passages. The hydraulic quill insert may separately direct hydraulic control signals from the hydraulic control device to the various flow passages of the countershafts to control the various clutch devices.

In certain embodiments, the hydraulic quill insert may include a cylindrical body, a mounting flange, and a plurality of hydraulic input features (e.g., a plurality of circumferential grooves) in hydraulic communication with the hydraulic control assembly. The cylindrical body may include an internal bore configured to separately receive each of the various countershafts. The cylindrical body may also include sets of control passages (e.g., sets of radial passages), with each set extending to the bore from an associated hydraulic input feature. Hydraulic control signals from the hydraulic control assembly may be separately directed from the hydraulic input features, through the sets of associated control passages to the various flow passages of the countershafts, depending on the particular countershaft received by the bore.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
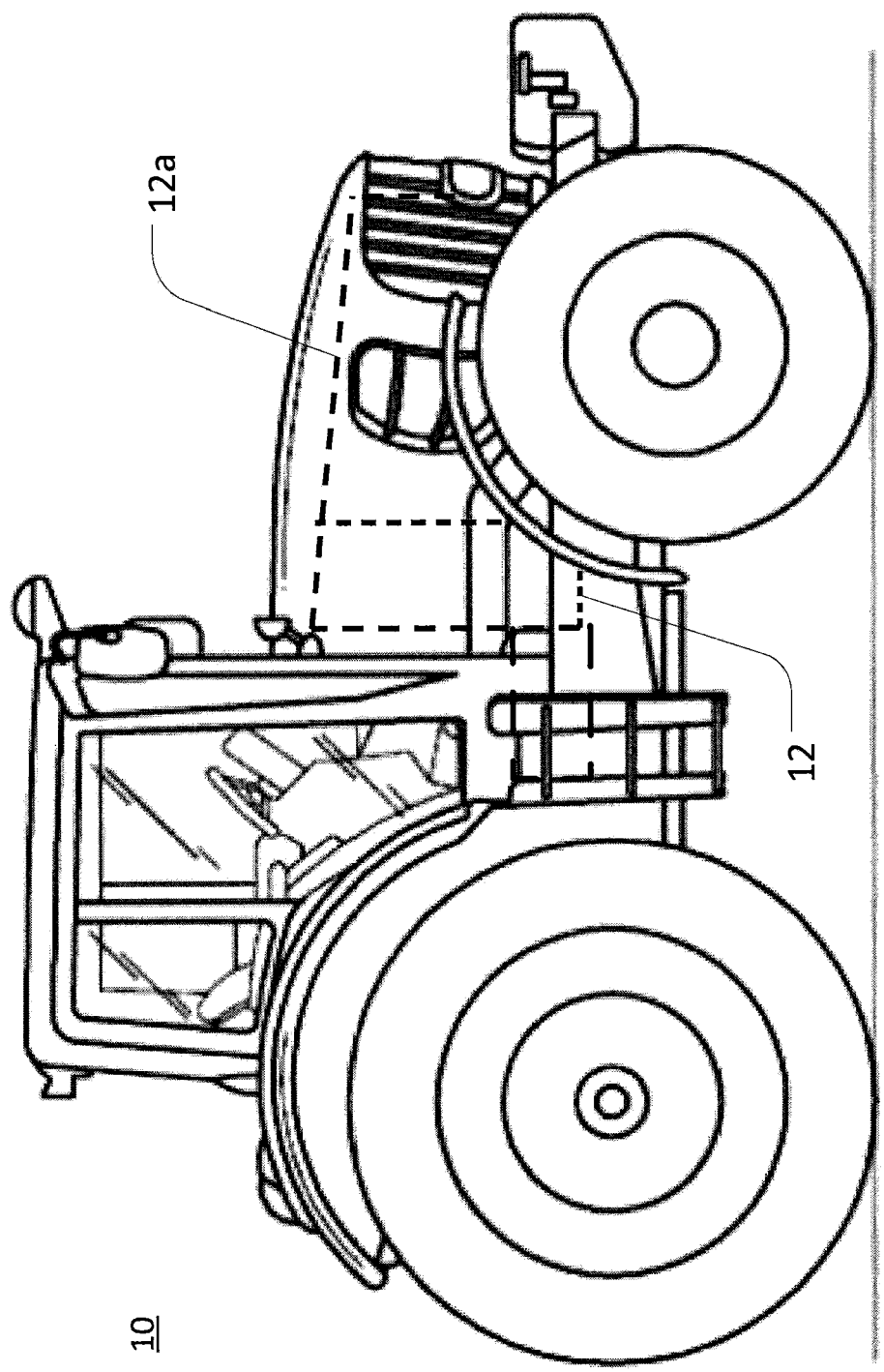
FIG. 1 is a side view of an example vehicle that may include a modular power train assembly according to the present disclosure.

The following describes one or more example embodiments of the disclosed modular assembly for a power train (or disclosed vehicle), as shown in the accompanying figures of the drawings described briefly above. Various modifications to the example embodiments may be contemplated by one of skill in the art.

In the discussion below, various example configurations of shafts, gears, and other power transmission elements are described. It will be understood that various alternative configurations may be possible within the spirit of this disclosure. For example, various configurations may utilize multiple shafts in place of a single shaft (or a single shaft in place of multiple shafts), may interpose one or more idler gears between various shafts or gears for the transmission of rotational power, may utilize various known mechanisms to connect gears or other devices to shafts for co-rotation or independent rotation of the gears and shafts, and so on. It will also be understood that discussion of particular gears as being fixed (or otherwise configured) with respect to a particular shaft is not intended to limit the disclosure, and that various alternative configurations providing similar power-transmission functionality may be possible. Likewise, although many examples below specifically refer to vehicular platforms, it will be understood that the principles of this disclosure may additionally (or alternatively) be applied to non-vehicle platforms (e.g., stationary powered installations).

As noted above, it may be useful to provide for multiple options for the configuration of a power train for a particular vehicle (or vehicles or other platform). For example, it may be useful to provide various transaxle configurations for a particular tractor (or other work vehicle) in order to provide a variety of power train choices to consumers. In certain implementations, simpler (and potentially lower-cost) configurations may appeal to certain consumers or may be useful for certain applications, while more complex (and potentially higher-cost) configurations may appeal to other consumers or may be useful for other applications. For example, a lower-cost configuration may include fewer gear ratio possibilities than a higher-cost configuration, may not include a power-reverser option, and so on, which may appeal to a particular subset of users. However, the introduction of such a variety of choices may tend to lead to increased manufacturing complexity, as it may correspond to an increase in the number of possible parts for the relevant vehicle(s) (or other system).

In order to reduce this tendency toward manufacturing complexity (and the potential corresponding increase in manufacturing cost), it may be useful to provide a modular assembly for various portions of a power train. For example, various power trains may include a transaxle or other assembly for transmission of power from a power source (e.g., an engine) to a power sink (e.g., various vehicle wheels, a power take-off ("PTO") output, and so on). In certain embodiments, certain aspects of such a transaxle (or other assembly) may be engineered to provide a common platform for a variety of different power-transmitting configurations. For example, where a portion of the transaxle (or other assembly) includes a countershaft transmission, various components of the countershaft transmission may be configured so as to be interchangeable without modification of the larger transaxle system, thereby allowing a variety of power train configurations to be assembled in a modular way on a common base platform. (Various examples below may specifically address such a transaxle assembly. It will be understood, however, that other configurations may be possible, including configurations without a transaxle.)

In certain embodiments, a housing of a transaxle (or another power train housing) may receive an input shaft and an output shaft. The input shaft, for example, may receive power from an internal combustion engine, and the output shaft may provide power to a power-shift transmission also included in the transaxle. With appropriate configuration of the housing and the two shafts, the housing may be able to separately receive input and output shafts of a variety of configurations, including with (or without) various clutch packs or other power control assemblies. The housing may also separately receive one of a variety of countershafts, which, along with various associated clutch packs or other power control assemblies, may allow a variety of gear ratios (including 1:1 and reversing ratios) to be interposed between the input shaft and the output shaft. As with the input and output shafts, with appropriate configuration of the housing and the various countershafts, the housing may be able to separately receive a variety of countershaft types without significant modification. In this way, for example, a common housing (and potentially common input and output shaft) may be utilized along with a variety of countershaft assemblies, in order to provide a variety of countershaft transmission types within the same transaxle envelope (i.e., through selective inclusion of a particular one of the various countershafts). Indeed, through appropriate configuration, common base parts for the various countershaft assemblies (e.g., common shaft castings) may also be utilized, with variations between different assemblies being provided through relatively simple machining operations applied to the common base parts. These arrangements may allow for relatively low cost, and essentially modular, assembly of vehicles, or vehicle sub-systems, having a variety of different features, capabilities, and costs.

Continuing, and as noted above, various countershaft assemblies in such a modular construction (as well as various input and output shaft configurations) may include one or more clutch devices (e.g., one or more wet clutch packs). It may accordingly be useful to provide a device (or device assembly) to facilitate control of each of these clutch devices, in each of the variety of possible configurations, without requiring significant modification of components or excessive numbers of additional parts. As such, for example, a hydraulic quill insert (also referred to as simply a "hydraulic quill" or "quill") may be provided, which may be mounted within the transaxle (or other) housing. In certain embodiments, such a quill may separately support the rotating countershafts at one end of the countershafts (i.e., may individually support one of the countershafts at a time, depending on which countershaft is being employed in the overall assembly) and may include a variety of flow passages extend from exterior input features of the quill (e.g., circumferential grooves on the quill) to an interior bore of the quill within which the countershafts rotate. The input features, in turn, may be in communication with various ports or passages through the transaxle housing, which may be configured to receive hydraulic control signals from a variety of control manifolds or other control assemblies (e.g., through selective drilling of particular flow passages through the housing, through particular configuration of the control manifold(s), and so on). Further, inlet features on the various countershafts may align with various of the flow passages through the quill, which may in turn direct control signals to a particular clutch pack (or other control device) associated with the countershaft. In this way, for example, hydraulic flow through a particular set of quill flow passages may be directed through particular inlet features, into a particular set of countershaft flow passages, and, thereby, to a particular clutch pack (or other control device).

Accordingly, a particular control logic may be implemented by a particular hydraulic control manifold (or other control assembly), with a hydraulic quill insert routing control signals from the manifold to an appropriate control device (e.g., through a supported countershaft to a particular clutch pack on the countershaft). With an appropriately configured quill, such control logic may then be varied for different power train configurations, without requiring a change (or significant changes) in the hydraulic quill, the housing, the input shaft, the output shaft, a base countershaft design, or various other components. For example, using the same hydraulic quill, various control schemes may be implemented through selection of different control manifolds, use of different countershafts (and different associated control devices), selective boring of different sets of control passages in a standardized countershaft (as may correspond with different arrangements of associated control devices), and so on.

A hydraulic quill, as described herein, may also provide various additional benefits beyond facilitating the interchangeability of control manifolds (or control logic), countershaft assemblies, or other power train components. For example, in cast housings with multiple cavities, use of a cylindrical quill may allow for production of a casting with a larger hole between the cavities, which may help to avoid casting breakage and the generation of excessive casting scrap. Further, in various embodiments, a quill may provide a face against which a support bearing for the various countershafts may be seated, which may increase the ease of system assembly.

As will become apparent from the discussion herein, the disclosed modular assembly may be used advantageously in a variety of settings and with a variety of machinery. For example, referring now to FIG. 1, the disclosed assembly (e.g., as included in power train 12 with engine 12a) may be included in vehicle 10. In FIG. 1, vehicle 10 is depicted as a tractor with power train 12. It will be understood, however, that other configurations may be possible, including configurations with vehicle 10 as a different kind of tractor, a harvester, a log skidder, a grader, or one of various other work vehicle types. It will further be understood that the disclosed power train assembly may also be used in non-work vehicles and non-vehicle applications (e.g., fixed-location powered installations).

Figure 2:
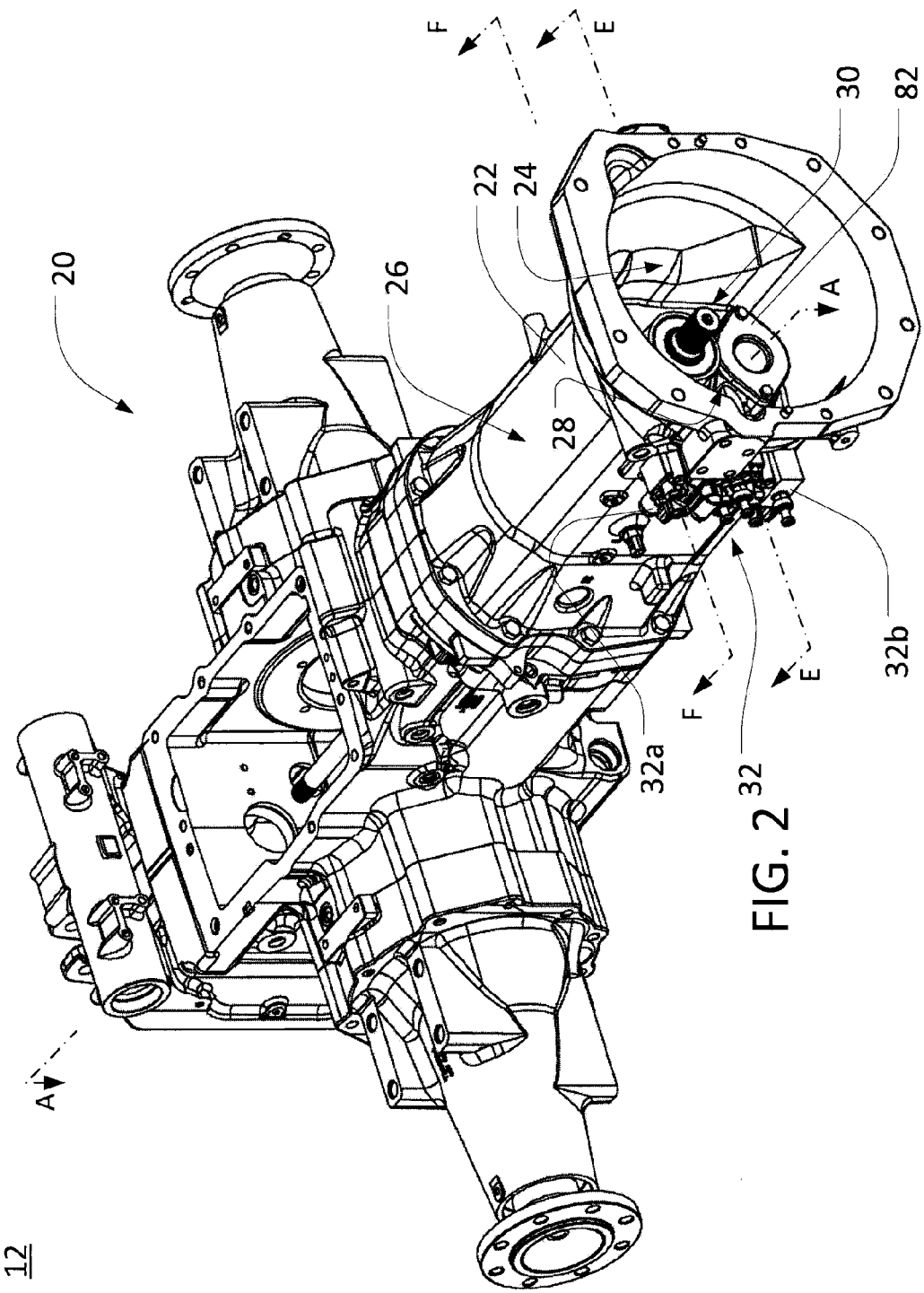
FIG. 2 is a schematic view of an example transaxle assembly of the example vehicle of FIG. 1.

Referring now to FIG. 2, power train 12 may include transaxle 20. Housing 22 may be included at an input end of transaxle 20, and may include cavities 24 and 26 separated by inter-cavity passage 28. Housing 22 may contain (e.g., within one or both of cavities 24 and 26) internal assembly 30, such as a countershaft transmission assembly including hydraulic quill 82 within passage 28.

As discussed in greater detail below, assembly 30 (e.g., configured as one of various countershaft transmissions) may include various control devices such as various wet clutch packs. In order to control such devices, hydraulic control assembly 32 (e.g., a hydraulic manifold of various configurations) may be attached to the exterior of housing 22. Control assembly 32 may include, for example, various pressure sensors and control valves, which may implement various hydraulic control logic schemes in order to control various devices (e.g., various clutches) within assembly 30. Accordingly, various inlet ports (not shown in FIG. 2) on housing 22 may be configured to align with various outlet ports (not shown in FIG. 2) of control assembly 32 in order to allow transmission of hydraulic control signals from control assembly 32 into housing 22. Such inlet ports may, for example, route certain of the received hydraulic signals to hydraulic quill 82, in order for quill 82 to appropriately route the signals (e.g., in conjunction with various other flow passages) to actually control various devices included in assembly 30.

In certain embodiments, control assembly 32 may be configured in a modular fashion. For example, main portion 32a may provide control flow logic for a first set of configurations (or devices) of internal assembly 30, and supplemental portion 32b may provide supplemental control flow logic for additional configurations (or devices) of internal assembly 30. As such, for example, main portion 32a, but not supplemental portion 32b, may be attached to housing 22 in a number of configurations of assembly 30 (with inlet ports to housing 22 bored accordingly). As needed, however, supplemental portion 32b (or various other control devices) may also be attached to housing 22 (with additional inlet ports into housing 22 being provided as appropriate to transmit control signals to appropriate components of assembly 30). In certain embodiments, portions 32a and 32b may share various aspects of a master hydraulic circuit, including a common pressure source, common fluid tank, and so on. For example, tank- and pressure-lines (not shown) for portion 32b may extend upward (from the perspective of FIG. 2) toward portion 32a, with appropriate ports (not shown) being machined into portion 32a to link these lines of portion 32b with corresponding lines within portion 32a. Various other configurations may also be possible, including configurations with greater or fewer numbers of control assemblies, configurations with pneumatic or other control assemblies, configurations in which different control assembly portions access different pressure sources, and so on.

Figure 3:
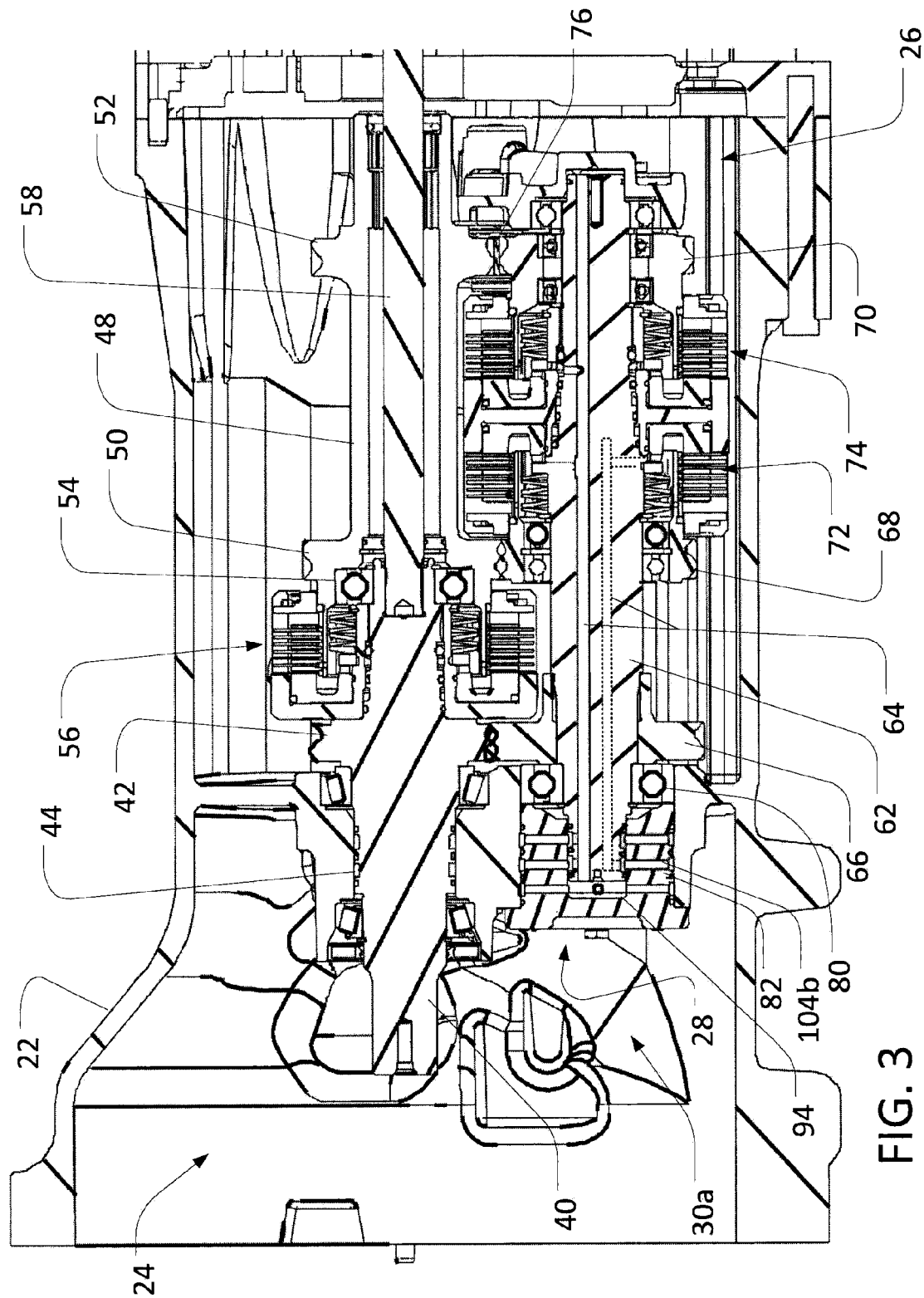
FIG. 3 is a sectional view of certain components of an example modular power train assembly that may be included in the transaxle assembly of FIG. 2, taken along plane A-A of FIG. 2.

Referring also to FIG. 3, example internal assembly 30a is depicted as a high-low, power-reverser countershaft transmission (e.g., a countershaft transmission with high- and low-gears and a reverse gear). As depicted, for example, input shaft 40, within housing 22, may receive power input from an engine (not shown) of vehicle 10. Input shaft 40 may include gear 42, which may be integrally formed with (or otherwise rotationally fixed to) shaft 40, as well as hydraulic inlet grooves 44 or various other features. (As noted above, it will be understood that various gears may be attached—slidably, rotatably, fixedly, or otherwise—to various shafts in various known ways.) Output shaft 48, which may, for example, be an input shaft to a downstream power-shift transmission (not shown), may also be included within housing 22. Shaft 48 may be rotatably supported on shaft 40 via bearing 54 and may include gears 50 and 52, which may be integrally formed with (or otherwise rotationally fixed to) shaft 48. Clutch device 56 (depicted in FIG. 3 as a wet clutch pack, although it will be understood that various other clutch devices may be utilized) may be disposed between shafts 40 and 48, such that when clutch device 56 is engaged power may be transmitted from shaft 40 to shaft 48 via clutch 56, but when clutch device 56 is disengaged, shaft 48 may generally rotate freely around shaft 40, via bearing 54. In certain embodiments, hydraulic control signals for clutch device 56 may be received from control assembly 32 via hydraulic inlet grooves 44 (and associated flow passages (not shown in FIG. 3) from control assembly 32 through housing 22), then routed within housing 22 in various known ways to clutch device 56. In certain embodiments, an additional output shaft (e.g., power take-off ("PTO") shaft 58 may also be provided.

A countershaft, such as countershaft 62, with various internal flow passages 64, may also be included within housing 22. One end of countershaft 62 may extend into hydraulic quill 82 and may be supported by bearing 80, which may seat against one or more features or faces of quill 82. Countershaft 62 may include gear 66, which may be rotationally fixed to (or integrally formed with) countershaft 62. Countershaft 62 may also include gears 68 and 70, and, respectively, associated clutch devices 72 and 74. Gear 68 may be meshed with gear 50 of shaft 48, and gear 70 may be meshed with idler gear 76, which may in turn be meshed with gear 52 of shaft 48. In this way, for example, countershaft 62 may always rotate with input shaft 40 (via gears 42 and 66), but gears 68 and 70, respectively, may rotate with countershaft 62 only when clutch device 72 or 74 is engaged. Accordingly, assembly 30*a* may be viewed as a high-low, power-reverser countershaft transmission, in which engaging clutch 56 and disengaging clutches 68 and 70 may allow direct transmission of power from shaft 40 to shaft 48, engaging clutch 68 and disengaging clutches 56 and 70 may impose a speed reduction between shafts 40 and 48, and engaging clutch 70 and disengaging clutches 56 and 68 may reverse the direction of rotation of shaft 48, with respect to shaft 40.

Figure 4:
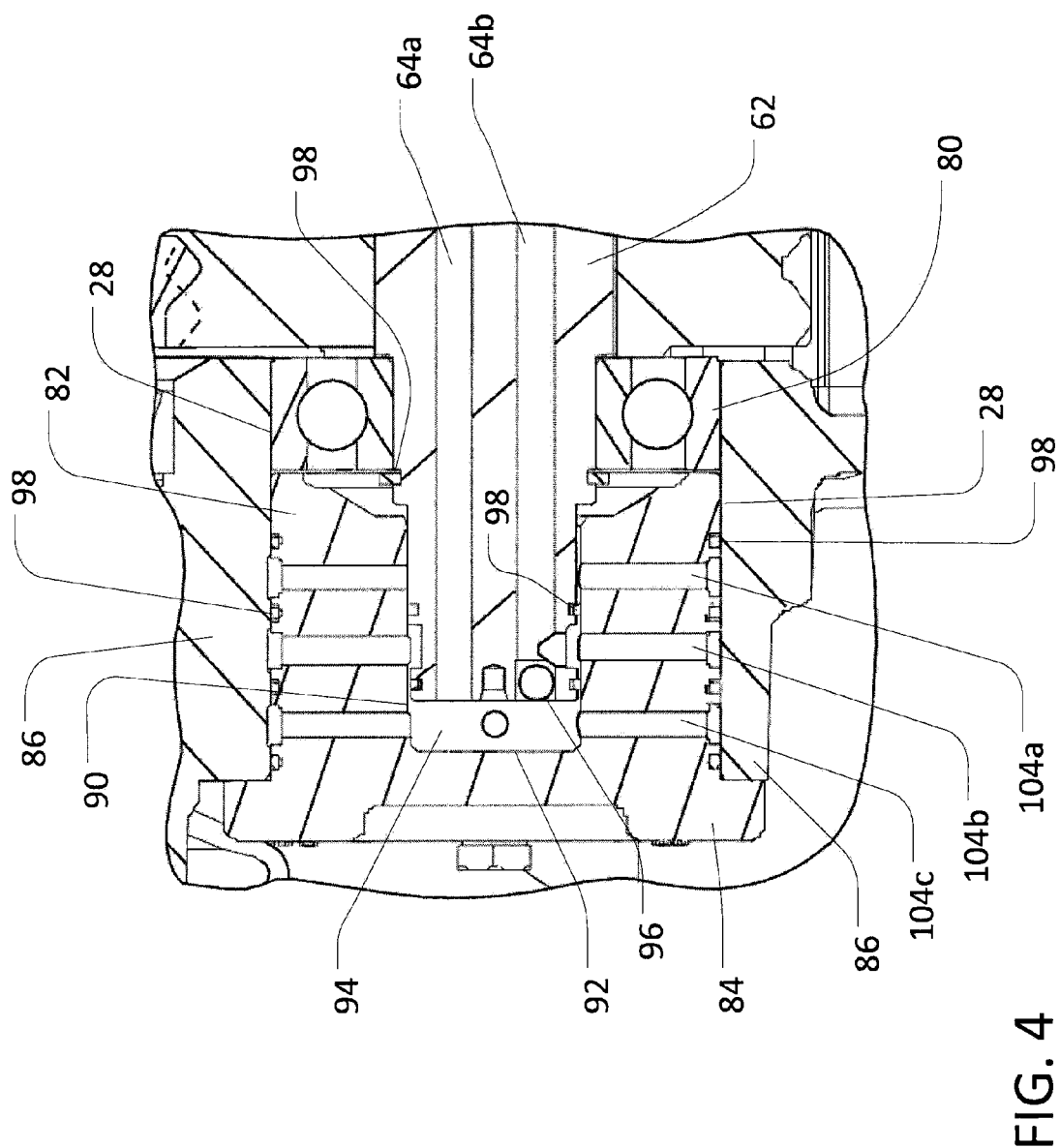
FIG. 4 is an enlarged partial sectional view of a hydraulic quill insert and countershaft included in the modular assembly of FIG. 3, taken from the same perspective as FIG. 3.
Figure 5A:
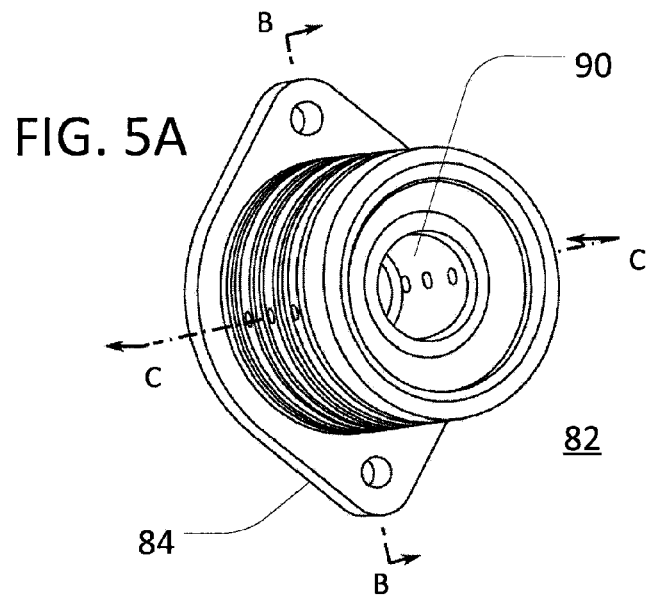
FIG. 5A is perspective view of the hydraulic quill insert of FIG. 4.
Figure 5B:
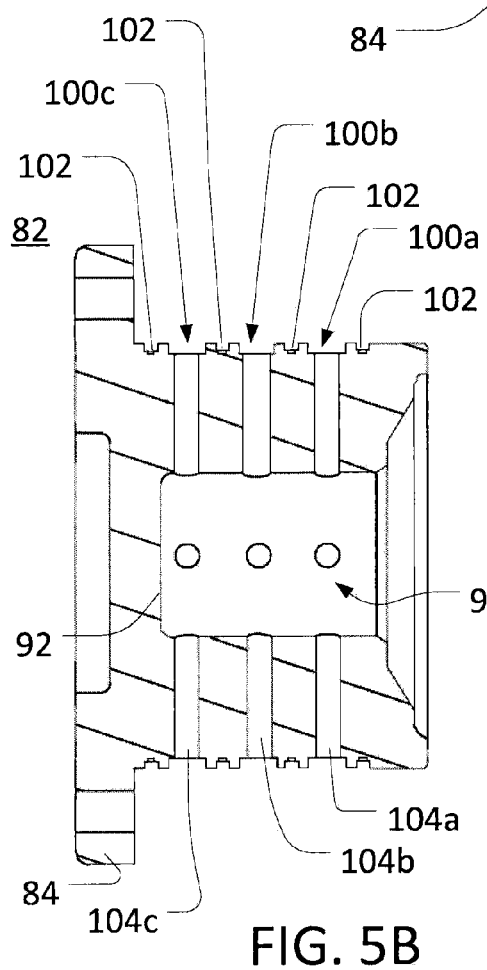
FIG. 5B is a sectional view of the hydraulic quill insert of FIG. 4, taken along plane B-B of FIG. 5A.
Figure 5C:
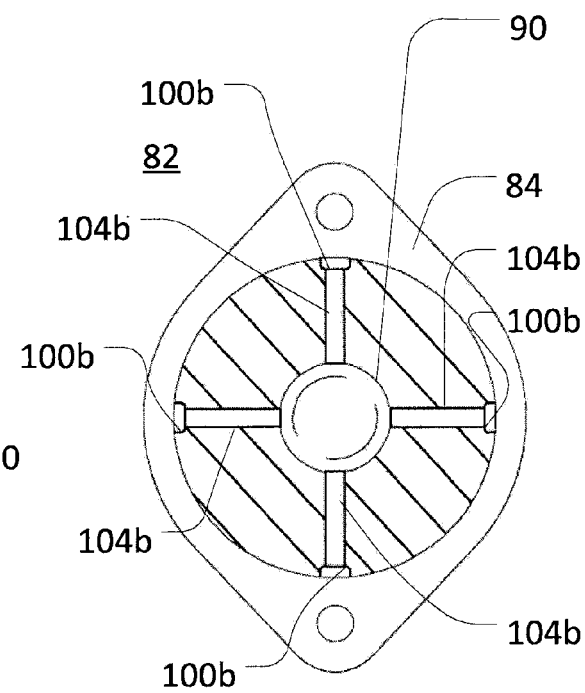
FIG. 5C is a sectional view of the hydraulic quill insert of FIG. 4, taken along plane C-C of FIG. 5A.

As noted above, and as discussed in greater detail below, hydraulic control logic for clutches 72 and 74 may be implemented by control assembly 32, with hydraulic signals from assembly 32 through housing 22 being routed by hydraulic quill 82 to various internal flow passages 64 of countershaft 62. Referring also to FIGS. 4-5C, for example, an example configuration of quill 82 is depicted in detail. As noted above, inter-cavity passage 28 may extend between housing cavities 24 and 26. In certain embodiments, passage 28 may be generally cylindrical, and quill 82 may be configured with a generally similar cylindrical shape, such that quill 82 may be secured within passage 28 within minimal clearance. Mounting flange 84 may be provided on quill 82 for mounting (e.g., via bolts or other fasteners) to various features of housing 22 (e.g., generally annular housing flange 86). Bore 90, which may be a blind bore with end wall 92 may extend into quill 82, and may be configured to receive an end (e.g., the left-side end, from the perspective of FIG. 4) of countershaft 62 (or another countershaft). In certain embodiments, with countershaft 62 fully inserted into bore 90, axial gap 94 may remain between the inserted end of countershaft 62 and end wall 92 of bore 90. As also noted above, countershaft 62 may be rotatably supported by bearing 80, which may be seated against quill 82. Various hydraulic or other seals or gaskets (e.g., seals 98) may be provided as appropriate.

Quill 82 may be configured to receive hydraulic control signals from control assembly 32 (e.g., via passages (not shown in FIG. 4) through housing 22) and route these signals appropriately for control of various components (e.g., various clutch devices) of assembly 30. In certain embodiments, various hydraulic input features, such as circumferential inlet grooves 100 may be arranged on an outer portion of quill 82. These features may be in communication with various sets of control passages 104 extending (e.g., radially) from the outer portion of quill 82 to bore 90. Various sealing grooves 102, which may be configured to receive various seals (e.g., various annular sealing members included in seals 98) may be provided to ensure hydraulic isolation of the various inlet grooves 100 (and the associated sets of control passages 104) from each other. As depicted in FIGS. 4-5C, for example, three circumferential inlet grooves 100*a*, 100*b*, and 100*c* may be provided, which may be in communication, respectively, with three sets of four radial control passages 104*a*, 104*b*, and 104*c*. This may correspond, in certain embodiments, to the ability to separately control three (or more) distinct devices (e.g., three distinct wet clutches) via quill 82, as each groove 100 and associated set of passages 104 may provide a distinct routing path for hydraulic control signals. For example, if a countershaft inserted into quill 82 is provided with three distinct sets of internal flow passages, with an inlet of each set being aligned, respectively, with a single set of control passages 104 and an outlet of each set being aligned, respectively, with a control inlet for one of three distinct clutch devices, each of the clutch devices may be controlled, respectively and separately, by a control signal that originates at control assembly 32 and is routed by quill 82 through the appropriate set of control passages 104. (In certain embodiments, one or more of such countershaft passages may open at the axial end of the countershaft, rather than along the countershaft circumference, and thereby receive a control signal via axial gap 94 and, for example, control passages 104*c*).

Referring specifically again to FIGS. 3 and 4, it can be seen that upper flow passage 64*a* of countershaft 62 may extend axially along countershaft 62 from axial gap 94 to a radial (or other) passage into clutch device 74. In this way, a signal from control assembly 32 that is routed by quill 82 to axial gap 94 (via control passages 104*c*) may be utilized to control clutch 74. Similarly, lower flow passage 64*b* may extend axially along countershaft 62 from a radial (or other) inlet aligned with control passage 104*b* to a radial (or other) outlet into clutch device 72. In this way, a signal from control assembly 32 that is routed by quill 82 through control passage 104*b* may be utilized to control clutch 72. It will be understood, accordingly, that a variety of configurations of a countershaft and a variety of associated controllable devices (e.g., associated clutch devices) may be provided, with control for such devices being effected through appropriate alignment (e.g., through appropriate cross-drilling or other machining) of countershaft-passage inlets with particular control passages 104 (or axial gap 94), and of countershaft-passage outlets with control inlets for the various devices. In certain embodiments, as depicted in FIG. 4, multiple countershaft passages (e.g., both of passages 64*a* and 64*b*) may extend to the axial end(s) of a countershaft and axial gap 94, with a plug (e.g., plug 96) being provided to prevent flow from axial gap 94 into certain of the passages (e.g., passage 64*b*).

Figure 6:
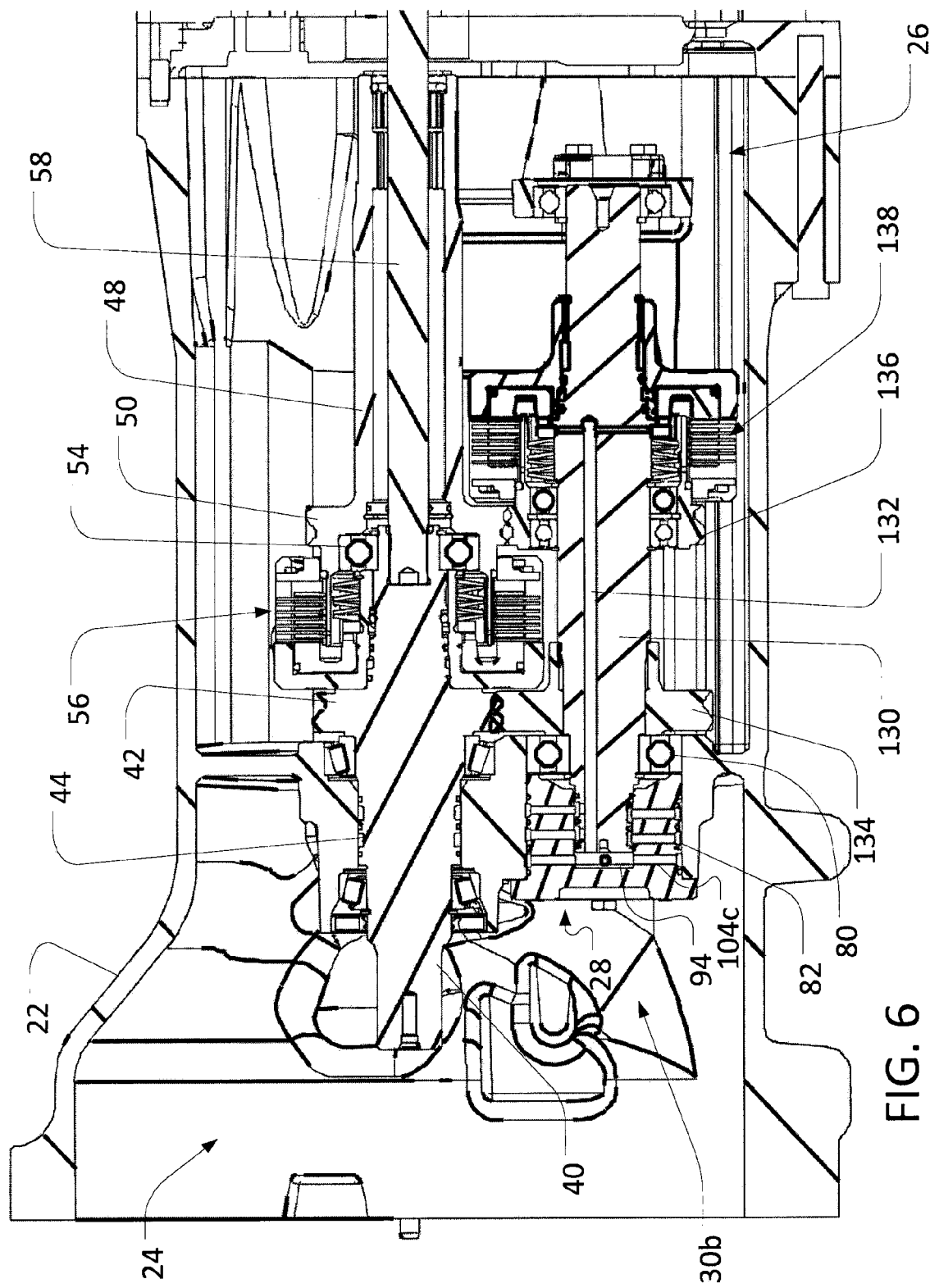
FIG. 6 is a sectional view of certain components of another example modular power train assembly that may be included in the transaxle assembly of FIG. 2, taken along plane A-A of FIG. 2.

As noted above, various other configurations may also be possible, using the same housing 22 (or a similar housing) and various shafts with the same (or similar) configurations as shafts 40, 48, and 62 (e.g., various shafts with similar base configuration, with various different internal passages, attached gears, attached clutch devices, and so on). For example, referring also to FIG. 6, example internal assembly 30*b* is depicted as a high-low countershaft transmission (e.g., a countershaft transmission with high- and low-gears). As depicted, for example, input shaft 40 and output shaft 48, configured similarly to the embodiment of FIG. 3, may again be included within housing 22. Gear 42, hydraulic inlet grooves 44, bearing 54, gear 50, and clutch device 56 (e.g., a wet clutch pack) may also be included and may operate similarly to the description of the embodiment of FIG. 3, above. It will be recognized accordingly, that many of the same (or similar) components may be utilized for the embodiment of FIG. 6 (and others) as may be used for the embodiment of FIG. 3.

A countershaft, such as countershaft 130, with various internal flow passages 132, may also be included within housing 22. Countershaft 130 may be similarly configured to countershaft 62, and may, in certain embodiments, be based upon the same (or a similar) base design, varying mainly due to different configurations of flow passages 132 (for countershaft 130) and flow passages 64 (for countershaft 62), and due to the attachment (or exclusion) of various different gears and clutch devices. For example, whereas gears 68 and 70 and clutch devices 72 and 74 may be attached to countershaft 62, gear 136 and clutch device 136 may be attached to countershaft 130. Similarly, flow passages 64 may be configured to route hydraulic control signals to both of clutch devices 72 and 74, whereas flow passage 13 may be configured to route hydraulic control signals only to clutch device 136. In certain embodiments, this may be achieved by casting countershafts 130 and 62 from the same (or similar) molds, then machining (e.g., drilling) appropriate inlet and outlet passages for the axial countershaft passages only for the clutch devices that are to be attached to the particular countershaft. Alternatively, a similar (or identical) countershaft base without axial passages may be created (e.g., cast) for both configurations, with appropriate axial passages 64 or 132 (and matching inlets and outlets) machined (e.g., drilled) depending on the particular clutch (or other) devices to be included.

As with countershaft 62, one end of countershaft 130 may extend into hydraulic quill 82 and may be supported by bearing 80, which may seat against one or more features or faces of quill 82. Countershaft 130 may include gear 134, which may be rotationally fixed to (or integrally formed with) countershaft 134 and which may be meshed with gear 42. (In certain embodiments, gear 134 may be similar or identical to gear 66.) As also noted above, countershaft 130 may also include gear 136 and associated clutch device 138. Gear 136 may be meshed with gear 50 of shaft 48, but rotatably mounted to countershaft 130, such that gear 136 may always co-rotate with gear 50, but may not always co-rotate with countershaft 130. In this way, for example, countershaft 130 may always rotate with input shaft 40, but gear 136 may rotate with countershaft 130 (and, potentially, drive rotation of output shaft 48) only when clutch device 138 is engaged. Accordingly, assembly 30b may be viewed as a high-low countershaft transmission, in which engaging clutch 56 and disengaging clutch 138 may allow direct transmission of power from shaft 40 to shaft 48, and engaging clutch 138 and disengaging clutch 56 may impose a speed reduction between shafts 40 and 48 (via countershaft 130). Control assembly 32, accordingly, may be configured to provide appropriate signals to quill 82 for appropriate routing (e.g., through axial control passage 104c and axial gap 94 to passage 132 and clutch 138).

Figure 7:
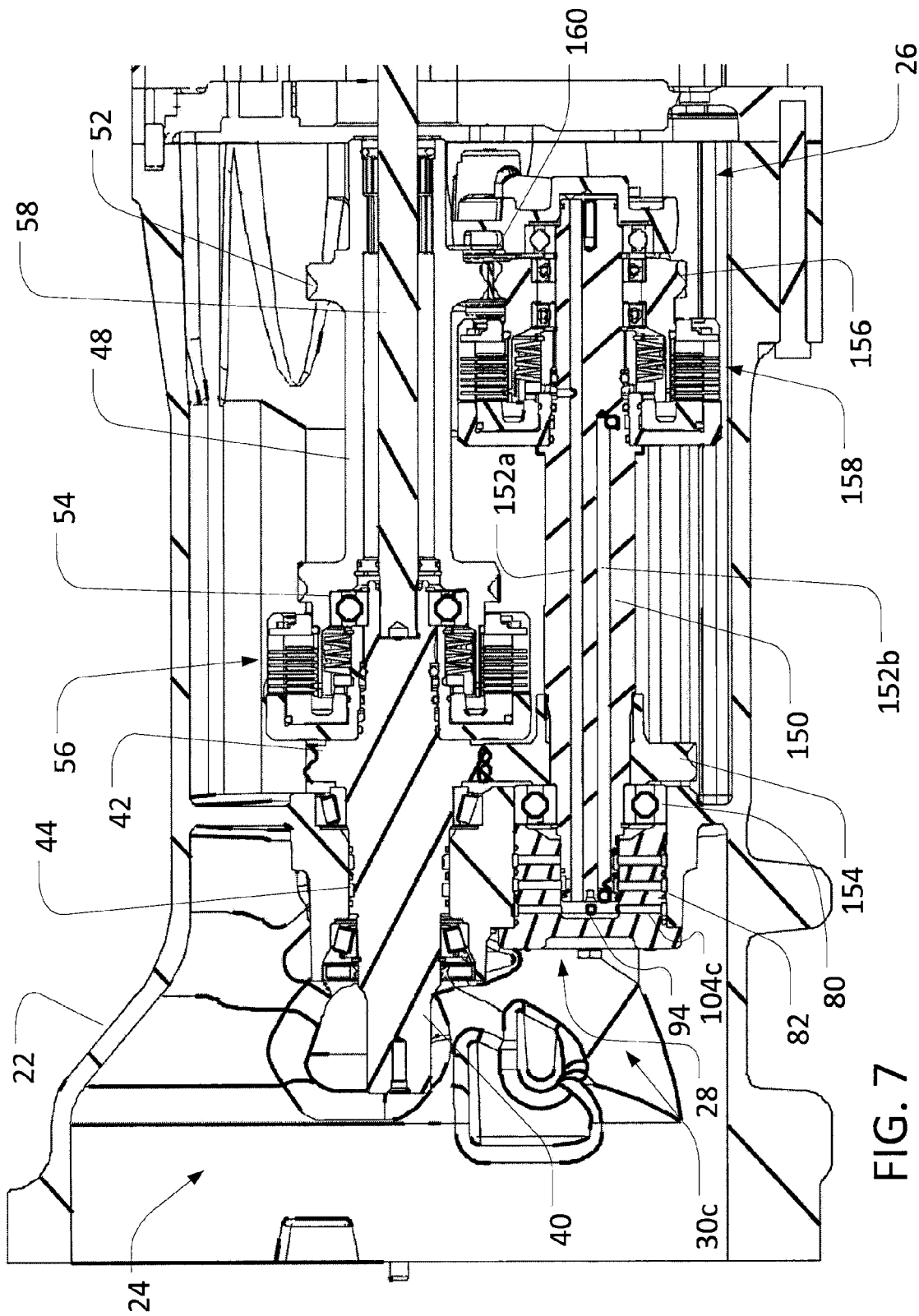
FIG. 7 is a sectional view of certain components of yet another example modular power train assembly that may be included in the transaxle assembly of FIG. 2, taken along plane A-A of FIG. 2.

Referring also to FIG. 7, through the use of similar countershaft 150, with gears 154 and 158 and clutch device 156, a power-reverser countershaft transmission may be provided. In such a configuration, engaging clutch 56 and disengaging clutch 158 may allow direct transmission of power from shaft 40 to shaft 48, and engaging clutch 158 and disengaging clutch 56 may reverse the direction of rotation of shaft 48, with respect to shaft 40 (via countershaft 150 and idler gear 160). As noted above, such a configuration may be obtained through the use of same or similar parts as other embodiments contemplated by this disclosure, including through the use of the same (or similar) configurations of input shaft 44 and associated devices, output shaft 48 and associated devices, and a common countershaft design, with appropriate machining (or other processing) to provide the appropriate configuration of flow passages 152. Likewise, control assembly 32 may be configured to provide appropriate signals to quill 82 for routing, in order to control the various clutch devices. For example, as depicted in FIG. 7, control for clutch 158 may be routed by quill 82 through control passages 104c and axial gap 94 to upper countershaft passage 152a, while lower passage 152b may be included in countershaft 150 (e.g., because pre-cast or pre-drilled into a base countershaft design), but may not provide a hydraulic connection to any controllable device (e.g., because no inlet or outlet passages have been created).

Still other configurations may also be possible. For example, in certain embodiments, additional (or different) gears and clutch devices may be provided beyond those of the specifically depicted examples. In certain embodiments, for example, an additional clutch and gear may be provided for countershaft 62 (FIG. 3), such that all three sets of control passages 104 of quill 82 may be utilized, respectively, to control the engagement (and disengagement) of three distinct gears. This may result, for example, in a countershaft transmission with two forward and one reverse gear ratios, as well as a direct connection between input and output shafts (e.g., via clutch 56). Further, in certain embodiments, an even greater number of gears (and related devices) may be controlled, through the inclusion of additional sets (not shown) of control passages 104 and inlet grooves 100 in quill 82, or the configuration of countershaft flow passages and control logic (as implemented, for example, by control assembly 32) for the control of multiple devices via a single countershaft flow passage. For example, if various countershaft devices (e.g., various clutch devices) were configured such that pressurization of a single countershaft flow passage effected complimentary actuation of the devices (e.g., engagement of one such device and disengagement of another such device), the number of devices to be controlled via quill 82 may exceed the number of sets of control passages 104 within quill 82 (and the corresponding number of countershaft passages).

Figure 8:
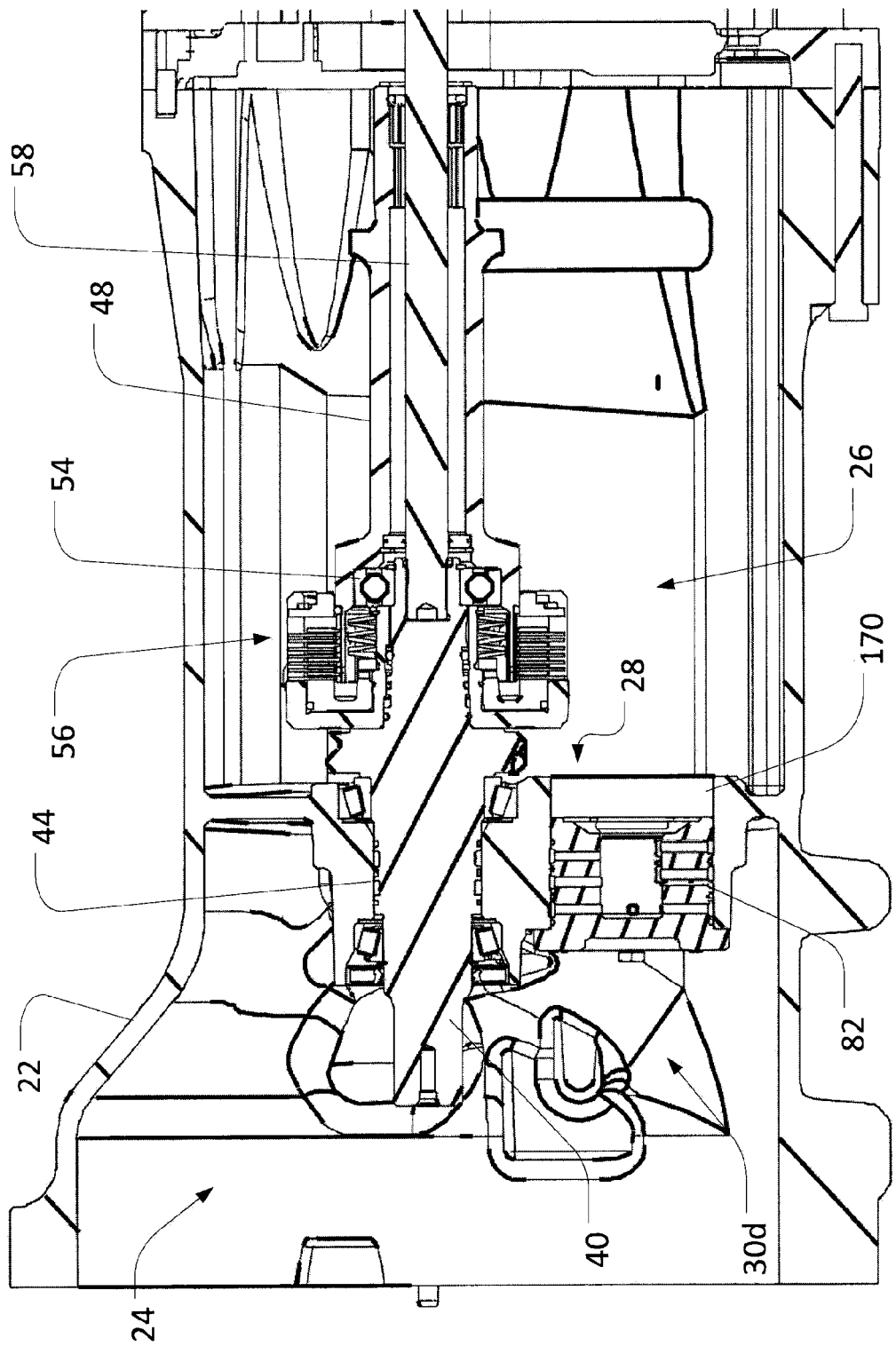
FIG. 8 is a sectional view of certain components of still another example modular power train assembly that may be included in the transaxle assembly of FIG. 2, taken along plane A-A of FIG. 2.
Figure 9A:
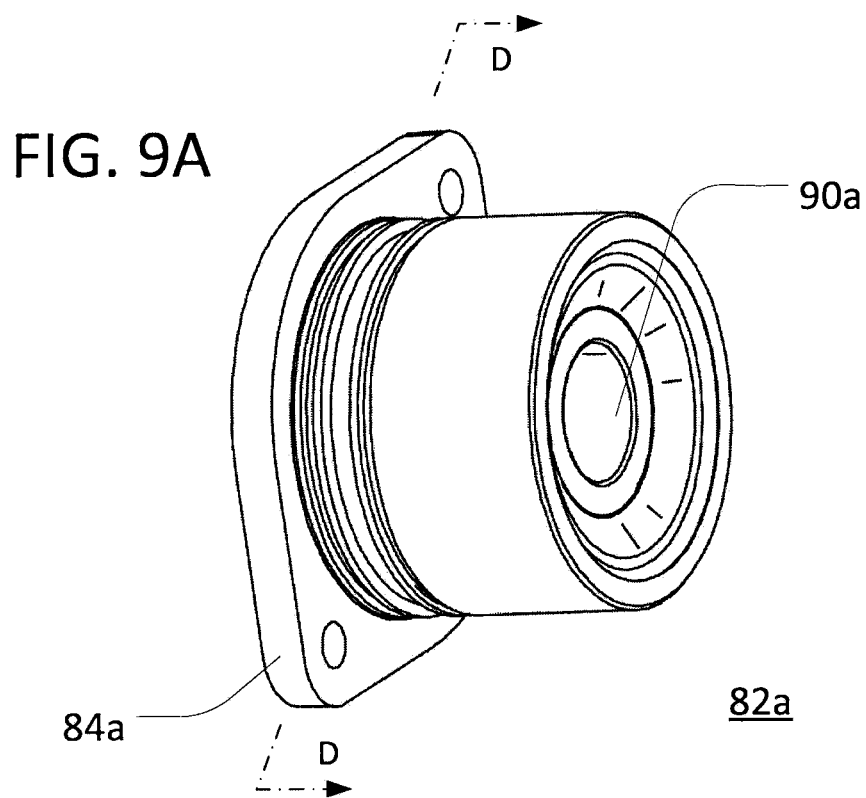
FIG. 9A is perspective view of an example hydraulic quill insert for the assembly of FIG. 8.
Figure 9B:
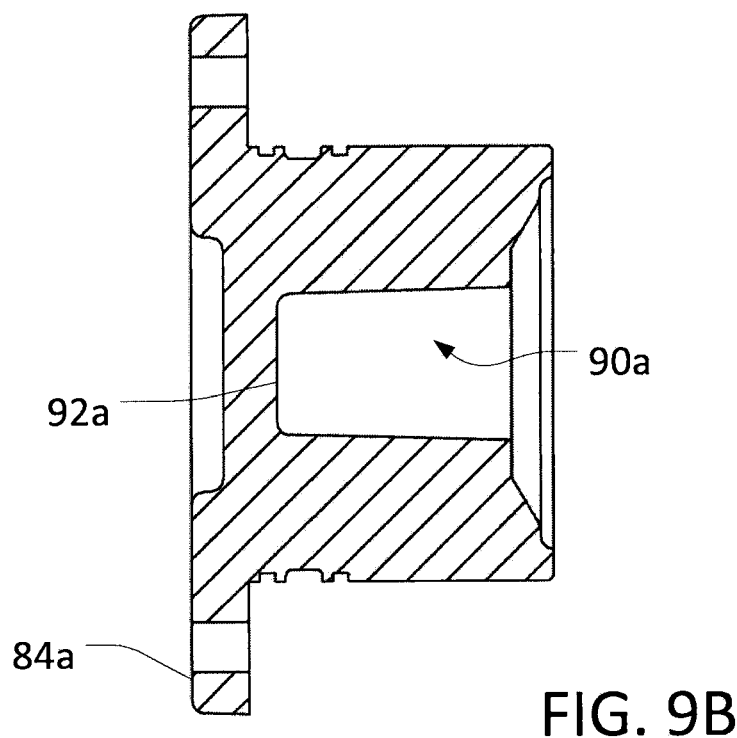
FIG. 9B is a sectional view of the hydraulic quill of FIG. 9A, taken along plane D-D of FIG. 9A.

Continuing, in certain embodiments, no countershaft may be provided in internal assembly 30. For example, referring also to FIG. 8, internal assembly 30d may not include a countershaft. As such, assembly 30d may operate simply as a wet-clutch transmission, in which power is transmitted from input shaft 44 to output shaft 48 when clutch 56 is engaged, but is not transmitted when clutch 56 is disengaged. In such a case, plug 170 may be provided in place of bearing 80 in order to prevent hydraulic leakage through plug 82. Alternatively, referring also to FIGS. 9A and 9B, quill 82a may be provided, which may include mounting flanges 84a and bore 90a with end wall 92a, but no input grooves or control passages.

Figure 10:
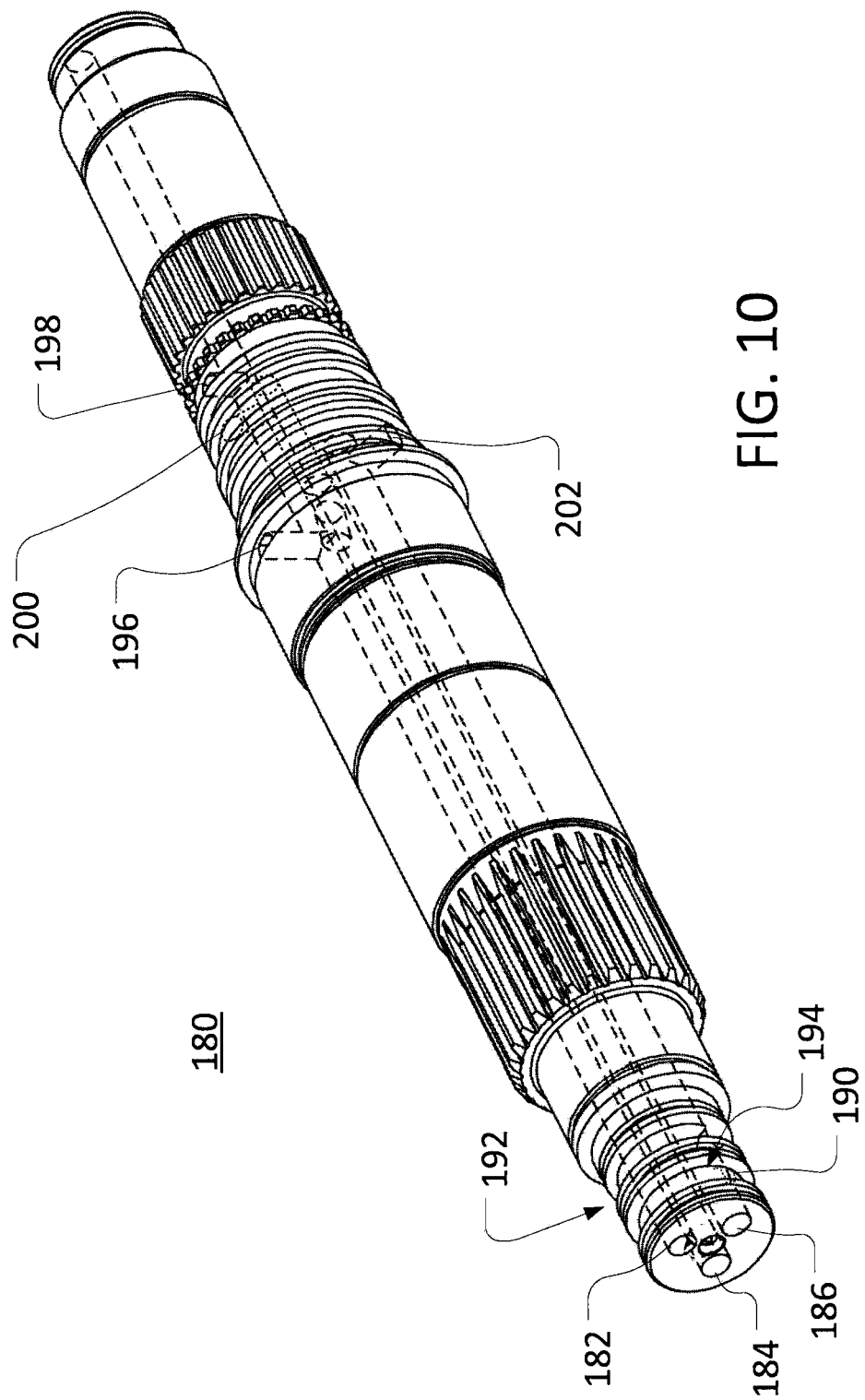
FIG. 10 is a perspective view of an example countershaft that may be included in a modular power train assembly.
Figure 11:
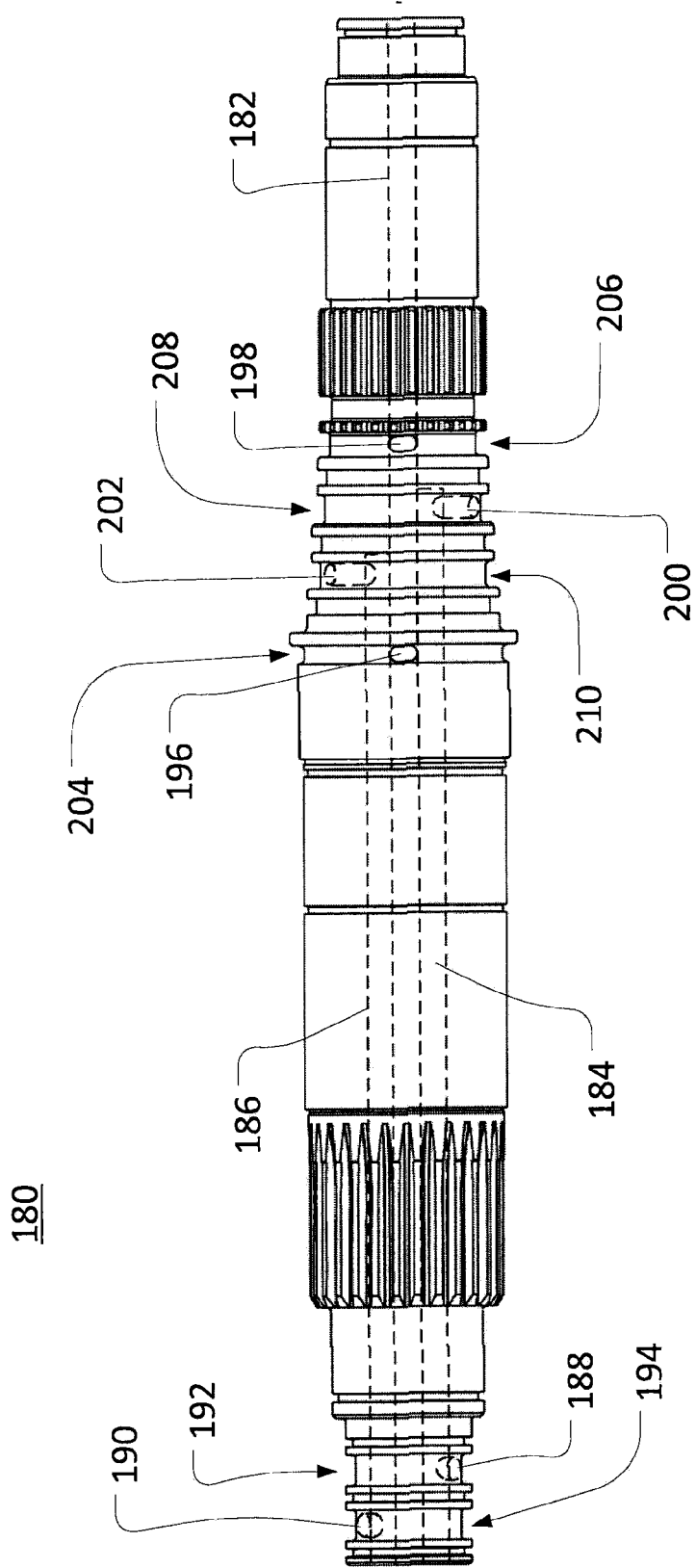
FIG. 11 is a bottom view of the example countershaft of FIG. 10.

As noted above, it may be possible to utilize various standardized components, including standardized countershaft templates, in the disclosed modular assembly. Referring also to FIGS. 10 and 11, for example, example standardized countershaft 180 may be provided. Countershaft 180 may, for example, be configured to be inserted into bore 90 of hydraulic quill 82 and to receive various configurations of gears, clutch devices, and so on, according to the desired configuration of transaxle 20 and internal assembly 30. In certain embodiments, countershaft 180 may be manufactured to always include a number of internal flow passages (e.g., flow passages 182, 184 and 186). For example, countershaft 180 may be cast to include the axial portions of passages 182, 184, and 186 or these axial portions may be machined (e.g., drilled) into countershaft 180 as a standard practice. Depending on the particular configuration of assembly 30 (e.g., the particular clutch devices included in assembly 30), radial inlet or outlet passages for flow passages 182, 184, and 186 may then be provided (e.g., through cross-drilling of countershaft 180). For example inlet passages may be provided to reach passages 182, 184, and 186, respectively, from various points representing appropriate inlet locations (e.g., locations aligned with various control passages 104 of quill 82), and outlet passages may be provided to reach passages 182, 184, and 186, respectively, from various points representing appropriate outlet locations (e.g., as aligned with control inlets for various clutch device). In certain embodiments, such inlet and outlet locations (and, accordingly, passages 182, 184, or 186) may be utilized for cooling or lubrication purposes rather than (or in addition to) for control of clutches or other devices.

In certain embodiments, and as specifically depicted in FIGS. 10 and 11, three sets of inlets and outlets may be provided for flow passages 182, 184, and 186, which may correspond to control (and/or cooling) of three (or more) distinct components of assembly 30 (e.g., three distinct clutch devices). As depicted, passage 182 may have an inlet at the left-side axial face of countershaft 180 (e.g., as aligned with axial gap 94) and outlets 196 and 198 (e.g., as cross-drilled or otherwise machined) at circumferential grooves 204 and 206 on the body of countershaft 180. Passage 184 may have inlet 188 machined at groove 192 (e.g., as aligned with control passages 104a of quill 82) and outlet 200 machined at groove 208. Finally, passage 186 may have inlet 190 machined at groove 190 (e.g., as aligned with control passages 104b of quill 82) and outlet 202 machined at groove 210. As such, for example passage 182 (via control passages 104c and axial gap 94) may provide cooling or lubrication to various components, passage 184 (via control passages 104a) may provide control for a first clutch device, and passage 186 (via control passages 104b) may provide control for a second clutch device. It will be understood that various other configurations are possible, based upon the configuration of passages 182, 184, 186 (or others) and the associated inlets and outlets. For example, various embodiments may include a greater or fewer number of axial passages (e.g., as cast or machined into a common countershaft design), different numbers or locations of inlets and outlets to the various countershaft passages, and so on. Due to the design of quill 82, such variations in countershaft design and the associated variations in control logic, may be implemented in a relatively simple manner and with minimal changes to housing 22 or other components of internal assembly 30.

Figures 12, 13:
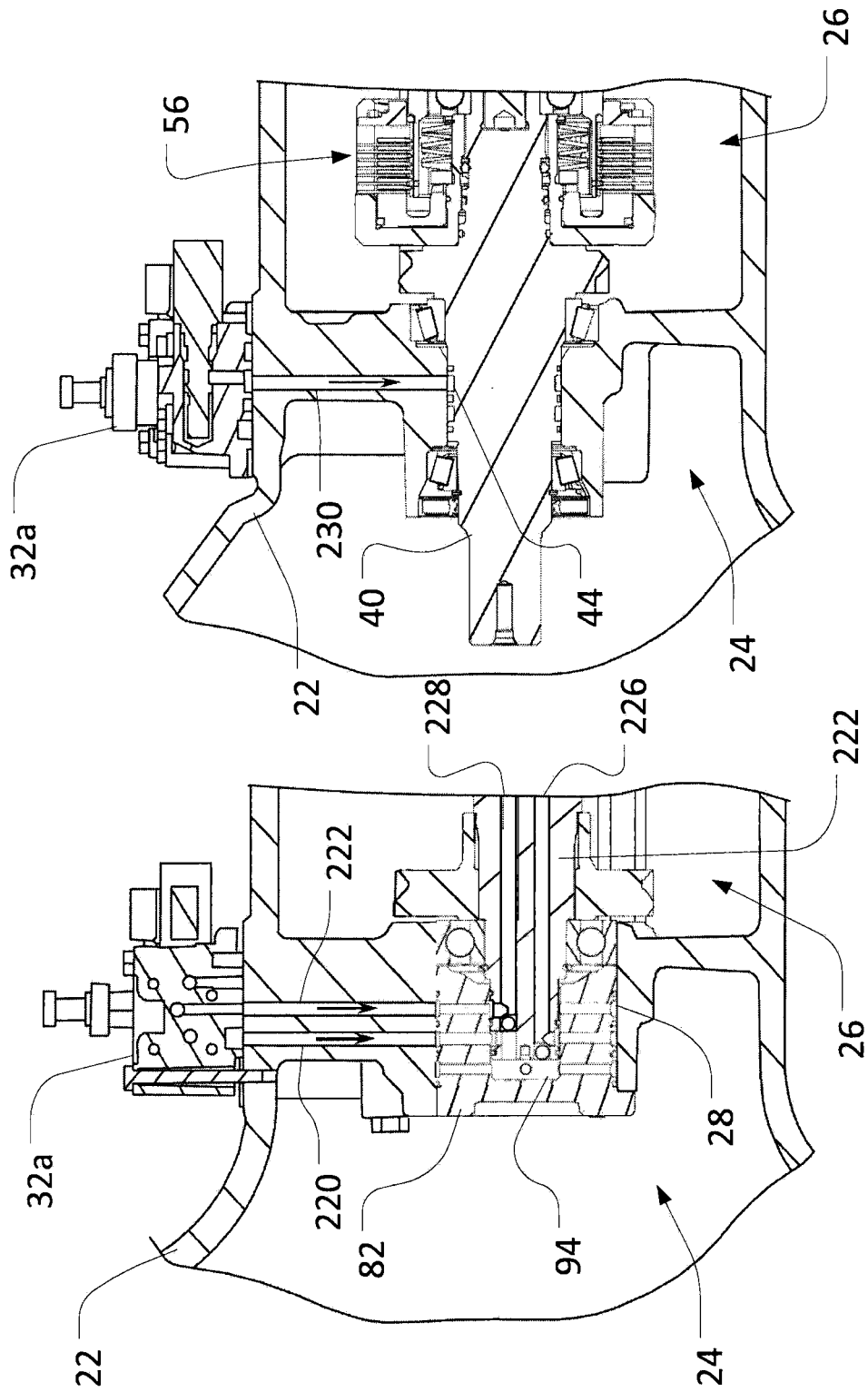
FIG. 12 is a sectional view of certain components of the transaxle assembly of FIG. 2, taken along plane E-E of FIG. 2.
FIG. 13 is a sectional view of certain components of the transaxle assembly of FIG. 2, taken along plane F-F of FIG. 2.

Referring now also to FIGS. 12 and 13, an example configuration of flow passages from control assembly 32 through housing 22 is presented. As also discussed above, variations in control architecture for various configurations of internal assembly 30 may be obtained by selectively drilling (or otherwise forming) various numbers and configurations of passages from control assembly 32 through housing 22. As depicted in FIG. 12, for example, passages 220 and 222 may extend from main portion 32a of control assembly 32, through housing 22, to hydraulic quill 82 (e.g., may have been drilled through housing 22 before installation of control assembly 32). These passages may accordingly provide control signals, via quill 82, to flow passages 226 and 228, respectively, within countershaft 222. Other passages (not shown) from assembly 32 through housing 22 may also be provided, including passages that are in or out of plane with passages 220 and 222. For example, an out of plane passage (not shown) may extend from supplemental portion 32b of assembly 32 (not shown in FIGS. 12 and 13) to axial gap 94 (or another feature of quill 82). Likewise, in certain embodiments, one or both of passages 220 and 222 (or other passages (not shown)) may not be provided or may be differently configured, in order to exclude or change certain routes for control signals from control assembly 32.

As depicted in FIG. 13, passage 230 may extend through housing 22 from main portion 32a of control assembly 32 to hydraulic inlet 44 (e.g., may have been drilled through housing 22 before installation of control assembly 32). Passage 230 may accordingly provide control signals to clutch device 56 via various known routing configurations extending from inlet 44 to device 56. Other passages (not shown) from assembly 32 through housing 22 may also be provided, including passages that are in or out of plane with passage 230. Likewise, in certain embodiments, passage 230 (or other passages (not shown)) may not be provided, in order to exclude the depicted route for control signals from control assembly 32.

In light of the discussion above, it will be recognized that various configurations of passages from hydraulic control assembly 32 through housing 22 may be provided depending, in part, on the particular configuration of internal assembly 30 (e.g., the particular countershaft, gears, clutch devices, and so on that are included). It will be recognized, however, that although such modification of housing 22 may allow a particular control logic to be implemented, housing 22 may not need to be modified to simply receive the various components of the various configurations of assembly 30. For example, in light of the discussion above, it will be understood that quill 82 within passage 28 may receive any of countershafts 62, 130, 150 or other countershafts without requiring modification of quill 82 or housing 22. Subsequent (or prior) modification of housing 22 to accommodate a particular flow control logic (e.g., drilling of various passages from control assembly 32 through housing 22) may then be implemented as appropriate.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A modular power-train assembly comprising:
   an assembly housing having first and second cavities, the first and second cavities being connected by an inter-cavity passage;
   an input shaft disposed, at least in part, within the first cavity of the housing, the input shaft including a first gear and receiving rotational power from a power source;
   an output shaft disposed, at least in part, within the first cavity of the housing;

a first clutch device providing a controllable power-transmission link between the input shaft and the output shaft;
a hydraulic control assembly providing hydraulic control signals to control, at least in part, power flow from the input shaft to the output shaft; and
a hydraulic routing system receiving hydraulic control signals from the hydraulic control assembly and directing the received hydraulic control signals to control, at least in part, power flow from the input shaft to the output shaft;
wherein a high-low power-reverser countershaft with second and third clutch devices includes a first geared connection to the first gear of the input shaft, a second geared connection to the output shaft via the second clutch device, and a third geared connection to the output shaft via the third clutch device and a first idler gear;
wherein a high-low countershaft with a fourth clutch device includes a fourth geared connection to the first gear of the input shaft, and a fifth geared connection to the output shaft via the fourth clutch device;
wherein a power-reverser countershaft with a fifth clutch device includes a sixth geared connection to the first gear of the input shaft, and a seventh geared connection to the output shaft via the fifth clutch device and a second idler gear;
wherein the assembly housing is configured to separately receive, without modification of the assembly housing, each of the high-low power-reverser countershaft, the high-low countershaft, and the power-reverser shaft; and
wherein the hydraulic routing system separately directs the received hydraulic control signals, respectively, to at least one of the second and third clutch devices, to the fourth clutch device, or to the fifth clutch device, depending on whether the high-low power-reverser countershaft, the high-low countershaft, or the power-reverser countershaft is currently received by the assembly housing.

2. The modular power-train assembly of claim 1, wherein the hydraulic routing system includes a hydraulic quill insert disposed, at least in part, in the inter-cavity passage, the hydraulic quill insert including a plurality of control passages.

3. The modular power-train assembly of claim 2, wherein the high-low power-reverser countershaft includes a first set of internal flow passages in communication with the second and third clutch devices;
wherein the high-low countershaft includes a second set of internal flow passages in communication with the fourth clutch device;
wherein the power-reverser countershaft includes a third set of internal flow passages in communication with the fifth clutch device; and
wherein the hydraulic quill insert separately directs the received hydraulic control signals, respectively and at least in part, into the first set of internal flow passages, the second set of internal flow passages, and the third set of internal flow passages.

4. The modular power-train assembly of claim 3, wherein the hydraulic quill insert includes a cylindrical body, a mounting flange, and a plurality of hydraulic input features in hydraulic communication with the hydraulic control assembly;
wherein the cylindrical body includes an internal bore for separate insertion of first ends of the high-low power-reverser countershaft, the high-low countershaft, and the power-reverser countershaft; and
wherein the cylindrical body further includes a plurality of sets of control passages, each set of control passages extending from the internal bore to an associated hydraulic input feature included in the plurality of hydraulic input features, whereby hydraulic control signals from the hydraulic control assembly are separately directed, respectively, from the hydraulic input features through the sets of control passages to the first, second and third sets of internal flow passages.

5. The modular power-train assembly of claim 4, wherein the plurality of hydraulic input features includes a plurality of circumferential grooves separated by a plurality of seals; and
wherein each set of control passages includes a plurality of control passages extending radially from the internal bore to the circumferential groove of the associated hydraulic input feature.

6. The modular power-train assembly of claim 4, wherein a bearing for at least one of the first ends of the high-low power-reverser countershaft, the high-low countershaft, and the power-reverser countershaft seats within the inter-cavity passage against the cylindrical body.

7. The modular power-train assembly of claim 4, wherein the internal bore is a blind bore with an end wall; and
wherein with first ends of the high-low power-reverser countershaft, the high-low countershaft, and the power-reverser countershaft separately inserted into the cylindrical bore, an axial gap remains between the first ends, respectively, and the end wall, the axial gap being in fluid communication with a set of control passages included in the plurality of sets of control passages.

8. A modular power-train assembly comprising:
an assembly housing having first and second cavities, the first and second cavities being connected by an inter-cavity passage;
an input shaft disposed, at least in part, within the first cavity of the housing, the input shaft receiving rotational power from a power source;
an output shaft disposed, at least in part, within the first cavity of the housing;
a first clutch device providing a controllable power-transmission link between the input shaft and the output shaft;
a hydraulic control assembly providing hydraulic control signals to control, at least in part, at least the first clutch device; and
a hydraulic quill insert disposed, at least in part, the inter-cavity passage, the hydraulic quill insert including a plurality of control passages, the hydraulic quill insert receiving hydraulic control signals from the hydraulic control assembly and directing the received hydraulic control signals to control, at least in part, power flow from the input shaft to the output shaft.

9. The modular power-train assembly of claim 8, wherein the input shaft includes a first gear;
wherein a high-low power-reverser countershaft with second and third clutch devices includes a first geared connection to the first gear of the input shaft, a second geared connection to the output shaft via the second clutch device, and a third geared connection to the output shaft via the third clutch device and a first idler gear;
wherein a high-low countershaft with a fourth clutch device includes a fourth geared connection to the first gear of the input shaft, and a fifth geared connection to the output shaft via the fourth clutch device;

wherein a power-reverser countershaft with a fifth clutch device includes a sixth geared connection to the first gear of the input shaft, and a seventh geared connection to the output shaft via the fifth clutch device and a second idler gear;

wherein the assembly housing is configured to separately receive, without modification of the assembly housing, each of the high-low power-reverser countershaft, the high-low countershaft, and the power-reverser shaft; and wherein the hydraulic quill insert separately directs the received hydraulic control signals, respectively, to at least one of the second and third clutch devices, to the fourth clutch device, and to the fifth clutch device, depending on whether the high-low power-reverser countershaft, the high-low countershaft, or the power-reverser countershaft is currently received by the assembly housing.

10. The modular power-train assembly of claim 9, wherein the high-low power-reverser countershaft includes a first set of internal flow passages in communication with the second and third clutch devices;

wherein the high-low countershaft includes a second set of internal flow passages in communication with the fourth clutch device;

wherein the power-reverser countershaft includes a third set of internal flow passages in communication with the fifth clutch device; and wherein the hydraulic quill insert separately directs the received hydraulic control signals, respectively and at least in part, into the first set of internal flow passages, the second set of internal flow passages, and the third set of internal flow passages.

11. The modular power-train assembly of claim 10, wherein the hydraulic quill insert includes a cylindrical body, a mounting flange, and a plurality of hydraulic input features in hydraulic communication with the hydraulic control assembly;

wherein the cylindrical body includes an internal bore for separate insertion of first ends of the high-low power-reverser countershaft, the high-low countershaft, and the power-reverser countershaft; and wherein the cylindrical body further includes a plurality of sets of control passages, each set of control passages extending from the internal bore to an associated hydraulic input feature included in the plurality of hydraulic input features, whereby hydraulic control signals from the hydraulic control assembly are separately directed, respectively, from the hydraulic input features through the sets of control passages to the first, second and third sets of internal flow passages.

12. The modular power-train assembly of claim 11, wherein the plurality of hydraulic input features includes a plurality of circumferential grooves separated by a plurality of seals; and wherein each set of control passages includes a plurality of control passages extending radially from the internal bore to the circumferential groove of the associated hydraulic input feature.

13. The modular power-train assembly of claim 11, wherein a bearing for at least one of the first ends of the high-low power-reverser countershaft, the high-low countershaft, and the power-reverser countershaft seats within the inter-cavity passage against the cylindrical body.

14. The modular power-train assembly of claim 11, wherein the internal bore is a blind bore with an end wall; and wherein with first ends of the high-low power-reverser countershaft, the high-low countershaft, and the power-reverser countershaft separately inserted into the cylindrical bore, an axial gap remains between the first ends, respectively, and the end wall, the axial gap being in fluid communication with a set of control passages included in the plurality of sets of control passages.

* * * * *